United States Patent [19]

Scarso

[11] Patent Number: 4,785,031

[45] Date of Patent: Nov. 15, 1988

[54] STABILIZED AND CARRIED RED PHOSPHORUS AS FLAME-RETARDANT AGENT FOR POLYMERS

[75] Inventor: Luciano Scarso, Milan, Italy

[73] Assignee: Saffa S.p.A., Pontenuovo di Magenta, Italy

[21] Appl. No.: 807,830

[22] Filed: Dec. 11, 1985

[30] Foreign Application Priority Data

Jun. 27, 1985 [IT] Italy ................................ 21311 A/85

[51] Int. Cl.$^4$ ........................... C08K 9/04; C08K 9/08; C08K 9/10; C08L 23/04
[52] U.S. Cl. .................................... 523/205; 523/206; 523/351; 524/80; 524/414
[58] Field of Search .................. 524/414, 80; 523/200, 523/205, 206, 351

[56] References Cited

U.S. PATENT DOCUMENTS

| | | | |
|---|---|---|---|
| 4,105,735 | 8/1978 | Dany et al. | 524/414 |
| 4,369,272 | 1/1983 | Jaffe | 523/205 |
| 4,371,642 | 2/1983 | Jaffe | 523/205 |
| 4,440,880 | 4/1984 | Albanesi et al. | 523/200 |
| 4,471,080 | 9/1984 | Rinaldi et al. | 525/205 |
| 4,524,160 | 6/1985 | Maeda et al. | 523/200 |

Primary Examiner—Allan M. Lieberman
Attorney, Agent, or Firm—Collard, Roe & Galgano

[57] ABSTRACT

Stabilized and carried red phosphorus as anti-flame agent for polymers, having its individual particles encapsulated into a synthetic resin, said particles being moreover aggregated to one another to form a plurality of pellets, each one of said pellets being constituted by a plurality of said particles bonded to one another by means of polyethylene with a density of 0.910–0.925 g/ml, and a melt index of 55–150, as expressed as g/10 minutes.

8 Claims, No Drawings

STABILIZED AND CARRIED RED PHOSPHORUS AS FLAME-RETARDANT AGENT FOR POLYMERS

FIELD OF THE INVENTION

The present invention relates to stabilized and carried red phosphorus for use as flame-retardant agent of materials on the basis of synthetic polymers.

DESCRIPTION OF THE PRIOR ART

It is known that red phosphorus (hereinunder indicated as red-P) is a very good flame-retardant agent for many materials on the basis of synthetic polymers. It is however known that red-P in powder form creates (during the various steps necessary for incorporating it into the above said materials) severe problems of safety and environmenal hygiene, as the handling of said red-P powder involves the danger of fires and explosions, as well as damage of hygienic character, above all in that red-P causes the appearance of phospine (known to be very toxic), by reaction with hydrogen-containing substances, in particular, water.

For the purpose of overcoming the environmental hygiene and safety problems to a more or less complete extent, various methods have been proposed for the "stabilization" or "protection" of red-P, in particular by the encapsulation of red-P and/or the mixing thereof with various synthetic resins and/or compounds of metals, in particular oxides. So e.g. U.S. Pat. No. 4,440,880 teaches to stabilize red-P in powder form by encapsulating the individual particles thereof with a modified melamine resin, which resin is a melamine, formaldehyde, triethanolamine and methanol condensation product.

U.S. Pat. No. 4,210,630 proposes in turn the stabilizing of red-P by means of a protecting layer of aluminium hydroxide in association with lead hydroxide, whilst U.S. Pat. No. 4,315,897 teaches to protect red-P powder by coating the particles thereof with a thin layer of an oxidation stabilizer constituted by a combination of an epoxy resin with aluminium hydroxide. Finally, U.K. Pat. No. 1,458,194 proposes the stabilizing of red-P by coating its particles with an elastomer (styrene-butadiene copolymer).

By the stabilization-protection methods as indicated above (given as typical examples illustrative of the known art), it is hence possible to provide red-P in powder form with decreased safety and environmental hygiene disadvantages, for the purpose of the incorporation thereof, as flame-retardant agent, into materials on the basis of synthetic polymers.

Said problems of environmental hygiene are however solved by the known art to a limited extent only: in fact, even if a red-P powder is stabilized by a protective coating, the same powder (e.g., containing particles with dimensions lower than 200 μm) is partly dispersed into the surrounding atmosphere during the processing stages, creating problems of environmental air pollution, detrimental for the human beings' breathing, and with danger of fires and explosions by contact or friction with hot surfaces (e.g. process equipment).

For the purpose of obviating the aforesaid air pollution problem, U.K. Pat. No. 1,326,929 proposes red-P powder to be incorporated into a lactam (preferably caprolactam), thus forming a "master-batch" of red-P carried (and protected) inside caprolactam, which "master-batch" is then used for the incorporation of red-P into the polymeric material (mostly polyamide). This method suffers however from the drawback that the lactam must be recovered during the said incorporation step (e.g., by vacuum extraction during the incorporation by extruder), to prevent said lactam from remaining incorporated (together with red-P) into the polymeic material, consequently altering its physical-mechanical characteristics.

SUMMARY OF THE INVENTION

The purpose of the present invention is hence to provide a stabilized-carried red-P powder, which avoids the above mentioned problems of the known art.

This and still other purposes, which shall appear from the following disclosure, are achieved by means of a red-P in the form of a protected powder, which red-P, according to the present invention, is constituted by particles encapsulated into synthetic resin, said particles being moreover aggregated to one another to form a plurality of pellets and the like, each one of said pellets being costituted by a plurality of said particles kept bonded to one another and coated by polyethylene having a density (as expressed, in the following too, as g/ml) of 0.910–0.925, preferably about 0.913, and a melt-index, (as g/10 minutes, according to ASTM-D 1238, Condition E), comprised within the range of from 55 to 150, preferably of about 70, said polyethylene constituting from 10 to 50% by weight of said pellets, the same polyethylene acting as the carrier for said red-P, to the purpose of the incorporation thereof into materials based on synthetic polymers.

DETAILED DISCLOSURE OF THE INVENTION

For the purpose of accomplishing the said stabilized-carried red-P, various methods per se known can be used. For instance, the encapsulating of the individual particles with synthetic resin can be carried out according to the method as disclosed in U.S. Pat. No. 4,440,880; whilst the forming of the pellets can be executed (for instance) by means of an extruder equipped with respectively up- and downstream known mechanical mixing and granulating devices, as it is better disclosed in Example 1 below.

The pellets so obtained can be regarded as a "master-batch" with very high concentration of red-P (about from 50 to 90% by weight), the polyethylene acting as the aggregating-carrying substance for the encapsulated red-P particles, which can be thus incorporated into the materials on the basis of synthetic polymers, without the drawbacks of the known art, the red-P stabilized-carried according to the invention resulting very stable chemically, and moreover dust-free.

It must be noticed that the type of aggregating-carrying substance according to the invention (and i.e., the polyethylene having the above indicated characteristics) is compatible with many and wide classes of polymeric materials, in particular (besides polyolefins of course) polyamides, such as polyamide-6 and polyamide-6,6, and the saturated polyesters, such as polyethylene-terephthalate, and polybutylene-terephthalate. This property (wide compatibility spectrum) is very important from the practical point of view, in that it allows, by using one single "masterbatch" type (pellets or the like according to the invention), red-P to be carried into many materials on the basis of synthetic polymers (to cause the same to become self-extinguishing) in a simple and easy way, and without introducing negative changes as for the characteristics of the same materials.

The pellets being the object of the present inventions have, preferably, average dimensions of the order of 2 to 5 mm, but both the dimensions and the shape of such pellets may be selected as desired relative to the technical requirements.

The amount of "master-batch" (or "encapsulated-carried red-P") according to the present invention to be incorporated in the materials based on synthetic polymers ranges from 5 to 30% by weight, according to the nature of the same, and of the "degree" of self-extinguishability whose achievement is desired.

For example, for the polyamides (either comprising or not comprising mineral reinforcing fillers, fiberglass and the like) amounts of the order of 10–12% by weight are necessary to obtain a V-0 self-extinguishability rating according to the UL-94 Standards (Underwriter Laboratories, U.S.A.).

The fact is finally to be pointed out that, by using the red-P masterbatch according to the present invention, its is possible to obtain in a direct way, advantageously, shaped finished items, e.g., by means of an injection-molding press (and similar equipment for plastic melt shaping) by feeding the same press, at the same time, respectively with the polymeric material to be made self-extinguishing and with the red-P master-batch according to the present invention, by adopting the usual conventional techniques. The feeding as mentioned can be of course accomplished also by pre-mixing with each other the two products as described above, which hence enter then the press as a mixture.

The following Examples, given only to the purpose of exemplifying and not of limiting the invention, shall be useful to better illustrate the same invention.

EXAMPLE 1

By following the directions of Example 1 of U.S. Pat. No. 4,440,880, red-P in powder form is prepared (with granulometry lower than 100 µm), stabilized by encapsulating into modified melamine resin.

Subsequently, by a high-rate mixer of known vertical type, a mixture is prepared (under inert atmosphere) comprising (% by weight):

75% of the red-P in encapsulated powder form, and
25% of polyethylene powder ("Escorene" MP 654-35 by ESSO CHIMICA S.p.a. of Milan), having a density of 0.913 g/ml, and a melt index of 70 (melt index expressed in g/10 minutes, according to ASTM-D 1238/Condition E).

The mixture is then brought to plastic-melting in a single-screw extruder and is then granulated to the form of small cylindrical pellets of 3×3 mm, representing the stabilized-carried red-P according to the invention (also indicated hereinunder as red-P/master-batch).

During the processing as above, no processing drawbacks are observed, and the end pellets so obtained appear as free-flowing and easily measurable and, above all, without any traces of dust.

EXAMPLE 2

By using the same red-P in encapsulated powder form of Example 1, inside a horizontal-drum blender a mixture is prepared (under inert gas) comprising (in % by weight) 85% of said red-P and 15% of the same polyethylene as used in Example 1. The mixture obtained is then turned into spherical pellets of about 3 mm in diameter, using a normal high-temperature pelletizing conventional line of known type.

In this case too, as in Example 1, no processing drawbacks are to be met, and the end pellets are free-flowing, easily measurable and dust-free.

EXAMPLE 3

Using a portion of the red-P/master-batch as obtained in Example 1, in a blender-extruder-pelletizer line of known type the following plastic compositions are prepared in the form of cylindrical pellets of 3×3 mm (amounts expressed as % by weight):

| (A) | Polyamide-6: | 90% |
| | red-P/master-batch: | 10% |
| (B) | Polyamide 6,6: | 70% |
| | fiberglass: | 20% |
| | red-P/master-batch: | 10% |
| (C) | Polyethylene-terephthalate: | 90% |
| | red-P/master-batch: | 10% |

For all the compositions as mentioned, by injection molding both ASTM specimens for the mechanical tests (ultimate tensile strength and elongation %) and specimens for the self-extinguishability UL 94 test/vertical specimen (dimensions 152.4×12.7×1.6 mm) are prepared.

The results of UL-94 test are successful in the sense that all the compositions as above mentioned appear to be self-extinguishing with V-0 rating, while the results of mechanical tests demonstrate that no significant changes occur between specimens made self-extinguishing by means of the incorporation into them of the red-P/master-batch according to the invention, and specimens into which the same master-batch has not been incorporated (comparison specimens).

EXAMPLE 4

An injection- molding press, of known type, equipped with a mold shaped according to the ASTM specimens for mechanical tests (ultimate tensile strength and elongation %) is contemporaneously fed with polyamide-6,6 pellets and red-P/master-batch (it too in pellet form according to the present invention) in the ratios by weight of 90% : 10%, in such a way finished items shaped according to the afore said ASTM specimens being obtained.

Similar specimens ("comparison specimens") are obtained in the same way by feeding the press with the same polyamide-6,6 only.

The mechanical tests carried out on the two specimen types yield results not significantly different from each other.

To the invention, as it has hereinabove disclosed and exemplified, variations and/or additions obvious for those skilled in the art can be made, without however going out of the protection sphere of the same invention. Thus, e.g., into the red-P/master-batch auxiliary substances conventional for polymers may be incorporated, such as synergistic anfi-flame additives, antistatics, stabilizers, antioxidants, lubricants and the like.

Moreover, encapsulated-carried red-P can be clearly associated, according to the invention, to other flame-retardant agents, to form compositions suitable to render self-extinguishing various types of polymers, either as already herein previously mentioned to exemplified purposes, or not explicitly mentioned.

Finally, the term "polyethylene", according to the present invention includes ethylene copolymers such as ethylene-vinyl acetate and ethylene acrylic ester, said copolymers containing at least 70% by weight of ethylene.

I claim:

1. A granular flame-retardant agent for plastic materials, comprising:
   50–90% by weight of particulate red phosphorus having individual particles encapsulated with a synthetic resin; and
   10–50% by weight of a binder-carrier for said red phosphorus, wherein said binder-carrier is an ethylene polymer selected from the group consisting of polyethylene and ethylene copolymers containing at least 70% by weight of ethylene having a density (g/ml) of 0.910–0.925, and melt-index (expressed as g/10 minutes, according to ASTM-D 1238/ Condition E) within the range of approximately from 55 to 150 wherein said granular flame-retardant agent comprises pellets prepared by granulating the aggregate formed by the mixture of said ethylene polymer binder-carrier and said encapsulated red phosphorus particles.

2. The granular flame-retardant agent according to claim 1, wherein said ethylene polymer has a density of about 0.913 and a melt-index of about 70.

3. The granular flame-retardant agent according to claim 1, wherein said ethylene polymer is a copolymer selected from the group consisting of ethylene-vinylacetate copolymer and ethylene acrylic ester copolymer, and a combination thereof.

4. A self extinguishing plastic material comprising at least one synthetic polymer, which is compatible with the ethylene polymer binder-carrier of claim 1, and having from 5% to 30% by weight of the flame-retardant agent according to claim 1.

5. The material according to claim 4, wherein said synthetic polymer is a member selected from the group consisting of polyamide-6, polyamide-6,6 polyethylene-terephtalate, polybutylene-terephtalate, and a combination thereof.

6. The material according to claim 5, wherein said polyamides comprise a reinforcing filler selected from the group consisting of fiberglass, mineral fillers, and a combination thereof.

7. The granular flame retardant agent according to claim 1, wherein said particles generally have a maximum dimension of 200 μm.

8. The granular flame retardant agent according to claim 1, wherein said encapsulated particles are aggregated wiht one another to form pellets having an average dimension of from 2 to 5 mm.

* * * * *